(12) United States Patent
Peterson

(10) Patent No.: US 12,728,795 B2
(45) Date of Patent: Sep. 8, 2026

(54) VEHICULAR INTERIOR REARVIEW MIRROR ASSEMBLY WITH PROXIMITY / TOUCH SENSOR

(71) Applicant: Magna Mirrors of America, Inc., Holland, MI (US)

(72) Inventor: Kenneth C. Peterson, Ada, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 18/987,094

(22) Filed: Dec. 19, 2024

(65) Prior Publication Data

US 2025/0214511 A1 Jul. 3, 2025

Related U.S. Application Data

(60) Provisional application No. 63/614,966, filed on Dec. 27, 2023.

(51) Int. Cl.

| | |
|---|---|
| ***B60R 1/12*** | (2006.01) |
| ***B60R 1/04*** | (2006.01) |
| ***B60R 1/08*** | (2006.01) |
| ***G01V 8/00*** | (2006.01) |
| ***G01V 8/12*** | (2006.01) |
| ***G02F 1/133*** | (2006.01) |
| ***G02F 1/163*** | (2006.01) |
| ***G06F 3/042*** | (2006.01) |
| ***G09G 3/36*** | (2006.01) |

(52) U.S. Cl.

CPC .................. *B60R 1/12* (2013.01); *B60R 1/04* (2013.01); *B60R 1/088* (2013.01); *G01V 8/005* (2013.01); *G01V 8/12* (2013.01); *G02F 1/13312* (2021.01); *G02F 1/163* (2013.01); *G06F 3/042* (2013.01); *B60R 2001/1223* (2013.01); *B60R 2001/1253* (2013.01); *G02F 2203/09* (2013.01); *G09G 3/36* (2013.01); *G09G 2320/0626* (2013.01); *G09G 2320/066* (2013.01); *G09G 2340/125* (2013.01); *G09G 2354/00* (2013.01); *G09G 2360/144* (2013.01); *G09G 2380/10* (2013.01)

(58) Field of Classification Search

None

See application file for complete search history.

(56) References Cited

U.S. PATENT DOCUMENTS

| | | | |
|---|---|---|---|
| 5,594,222 | A | 1/1997 | Caldwell |
| 6,001,486 | A | 12/1999 | Varaprasad et al. |
| 6,310,611 | B1 | 10/2001 | Caldwell |

(Continued)

FOREIGN PATENT DOCUMENTS

WO WO 2022241423 * 11/2022 ............... G02B 5/08

*Primary Examiner* — Ifedayo B Iluyomade

(74) *Attorney, Agent, or Firm* — HONIGMAN LLP

(57) ABSTRACT

A vehicular interior rearview mirror assembly includes a mirror head adjustable about a mounting base. The mirror head accommodates a mirror reflective element. A light emitter is accommodated by the mirror head and is electrically operated to emit near infrared (NIR) light. A light sensor is accommodated by the mirror head and, when the light emitter emits NIR light, the light sensor detects NIR light that reflects off an object within the cabin and that passes through the mirror reflective element. Based on detection of NIR light by the light sensor, presence of a user's hand at or near the mirror reflective element is determined.

28 Claims, 11 Drawing Sheets

(56) References Cited

U.S. PATENT DOCUMENTS 6,320,282 B1 11/2001 Caldwell
6,627,918 B2 9/2003 Getz et al.
7,184,190 B2 2/2007 McCabe et al.
7,224,324 B2 5/2007 Quist et al.
7,249,860 B2 7/2007 Kulas et al.
7,253,723 B2 8/2007 Lindahl et al.
7,255,451 B2 8/2007 McCabe et al.
7,274,501 B2 9/2007 McCabe et al.
7,289,037 B2 10/2007 Uken et al.
7,360,932 B2 4/2008 Uken et al.
7,446,924 B2 11/2008 Schofield et al.
7,626,749 B2 12/2009 Baur et al.
8,049,640 B2 11/2011 Uken et al.
8,277,059 B2 10/2012 McCabe et al.
8,508,831 B2 8/2013 De Wind et al.
8,529,108 B2 9/2013 Uken et al.
8,730,553 B2 5/2014 De Wind et al.
9,174,578 B2 11/2015 Uken et al.
9,346,403 B2 5/2016 Uken et al.
9,598,016 B2 3/2017 Blank et al.
9,827,913 B2 11/2017 De Wind et al.
10,029,614 B2 7/2018 Larson
10,046,706 B2 8/2018 Larson et al.
10,166,924 B2 1/2019 Baur
10,421,404 B2 9/2019 Larson et al.
10,442,360 B2 10/2019 LaCross et al.
11,214,199 B2 1/2022 LaCross et al.
11,242,008 B2 2/2022 Blank et al.
11,639,134 B1 5/2023 Huizen et al.
11,766,968 B2 9/2023 Peterson et al.
11,780,372 B2 10/2023 Sobecki et al.
2006/0050018 A1 3/2006 Hutzel et al.
2007/0171037 A1* 7/2007 Schofield ................ B60Q 1/22 340/438
2014/0022390 A1 1/2014 Blank et al.
2014/0293169 A1 10/2014 Uken et al.
2017/0355312 A1 12/2017 Habibi et al.
2019/0118717 A1 4/2019 Blank et al.
2019/0146297 A1 5/2019 Lynam et al.
2019/0258131 A9 8/2019 Lynam et al.
2020/0377022 A1 12/2020 LaCross et al.
2021/0155167 A1 5/2021 Lynam et al.
2021/0162926 A1 6/2021 Lu
2022/0270409 A1* 8/2022 Kramer .................. G06V 40/28
2024/0075878 A1 3/2024 Peterson
2025/0178532 A1 6/2025 Zerbe

* cited by examiner

VEHICULAR INTERIOR REARVIEW MIRROR ASSEMBLY WITH PROXIMITY / TOUCH SENSOR

CROSS REFERENCE TO RELATED APPLICATION

The present application claims the filing benefits of U.S. provisional application Ser. No. 63/614,966, filed Dec. 27, 2023, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single ball pivot or joint mounting configuration or double ball pivot or joint mounting configuration where the mirror casing and reflective element are adjusted relative to the interior portion of a vehicle by pivotal movement about the single or double ball pivot configuration. The mirror casing and reflective element are pivotable about either or both of the ball pivot joints by a user that is adjusting a rearward field of view of the reflective element. The mirror reflective element may comprise an electrochromic mirror reflective element comprising a front glass substrate and a rear glass substrate with an electrochromic medium sandwiched between the glass substrates and bounded by a perimeter seal.

SUMMARY OF THE INVENTION

An interior rearview mirror assembly, such as a vehicular electrochromic rearview mirror assembly, includes a mounting structure configured to attach at an interior portion of a cabin equipped with the mirror assembly. A mirror head is adjustable relative to the mounting structure and accommodates an electrochromic mirror reflective element. With the mounting structure attached at the interior portion of the cabin of the vehicle, the mirror head is adjustable by a driver of the vehicle to set a rearward view for the driver. A light emitter is accommodated by the mirror head. The light emitter, with the mounting structure attached at the interior portion of the cabin of the vehicle, and when the light emitter is electrically operated, emits near infrared (NIR) light. A sensor, such as a NIR proximity sensor, is accommodated by the mirror head. The sensor, with the mounting structure attached at the interior portion of the cabin of the vehicle, and when the light emitter is electrically operated to emit light, generates sensor data based on detection of NIR light reflected from objects within the cabin of the vehicle that passes through the electrochromic mirror reflective element. Based on generated sensor data, presence of a user's hand at or near an icon at the electrochromic mirror reflective element is detected. Based on detection of the user's hand at or near the icon, a control signal is transmitted to a system of the vehicle.

These and other objects, advantages, purposes and features of the present invention will become apparent upon review of the following specification in conjunction with the drawings.

DESCRIPTION OF THE PREFERRED EMBODIMENTS

Figure 1:
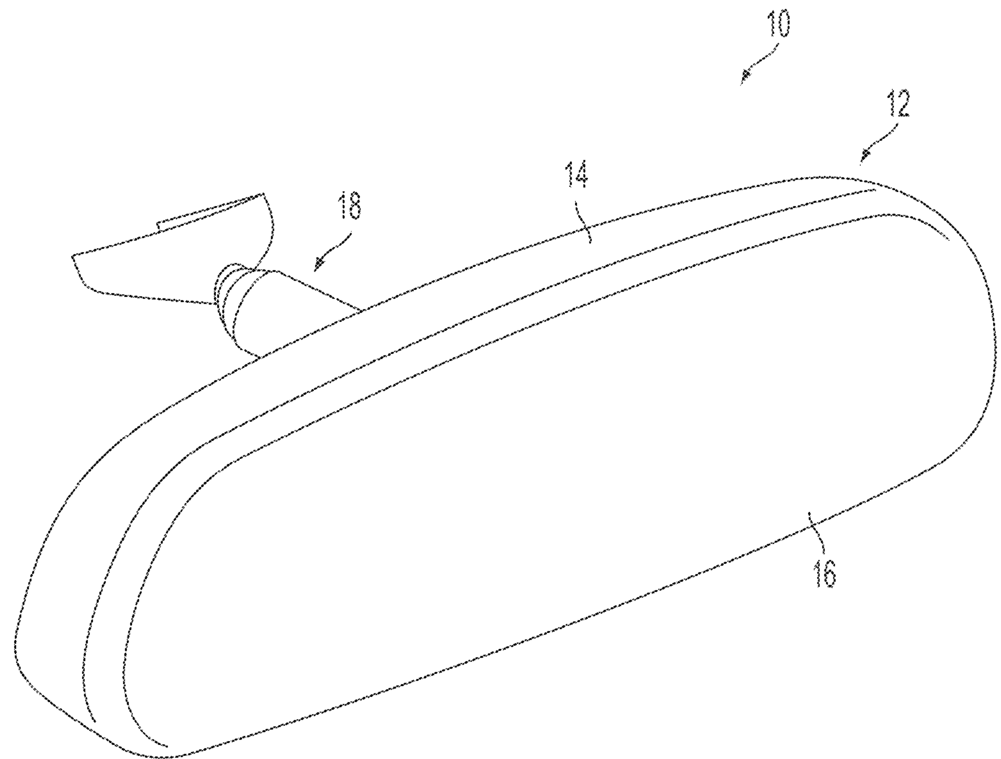
FIG. 1 is a perspective view of an interior rearview mirror assembly.

Referring now to the drawings and the illustrative embodiments depicted therein, a vehicular interior rearview mirror assembly 10 includes a mirror head 12 that includes a casing 14 and a reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element 16 includes a variable reflectance mirror reflective element that varies its reflectance responsive to electrical current applied to conductive coatings or layers of the reflective element. As discussed further below, the mirror assembly 10 includes one or more proximity or touch sensors, such as an infrared (IR) proximity sensor, disposed behind the mirror reflective element 16 and configured to detect presence of a user's finger at or near the mirror reflective element 16 to provide a user actuatable input at the mirror assembly 10.

Figure 2:
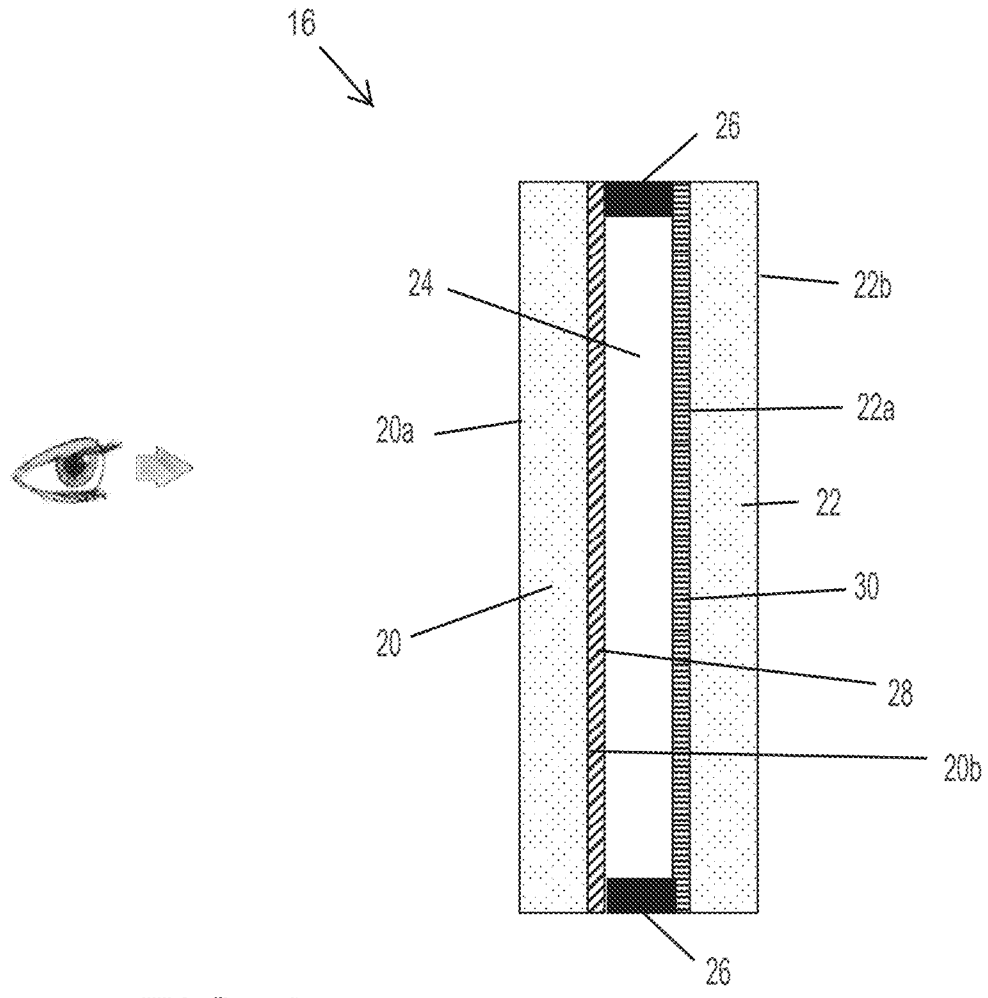
FIG. 2 is a sectional view of the mirror reflective element of the mirror assembly.
Figure 3:
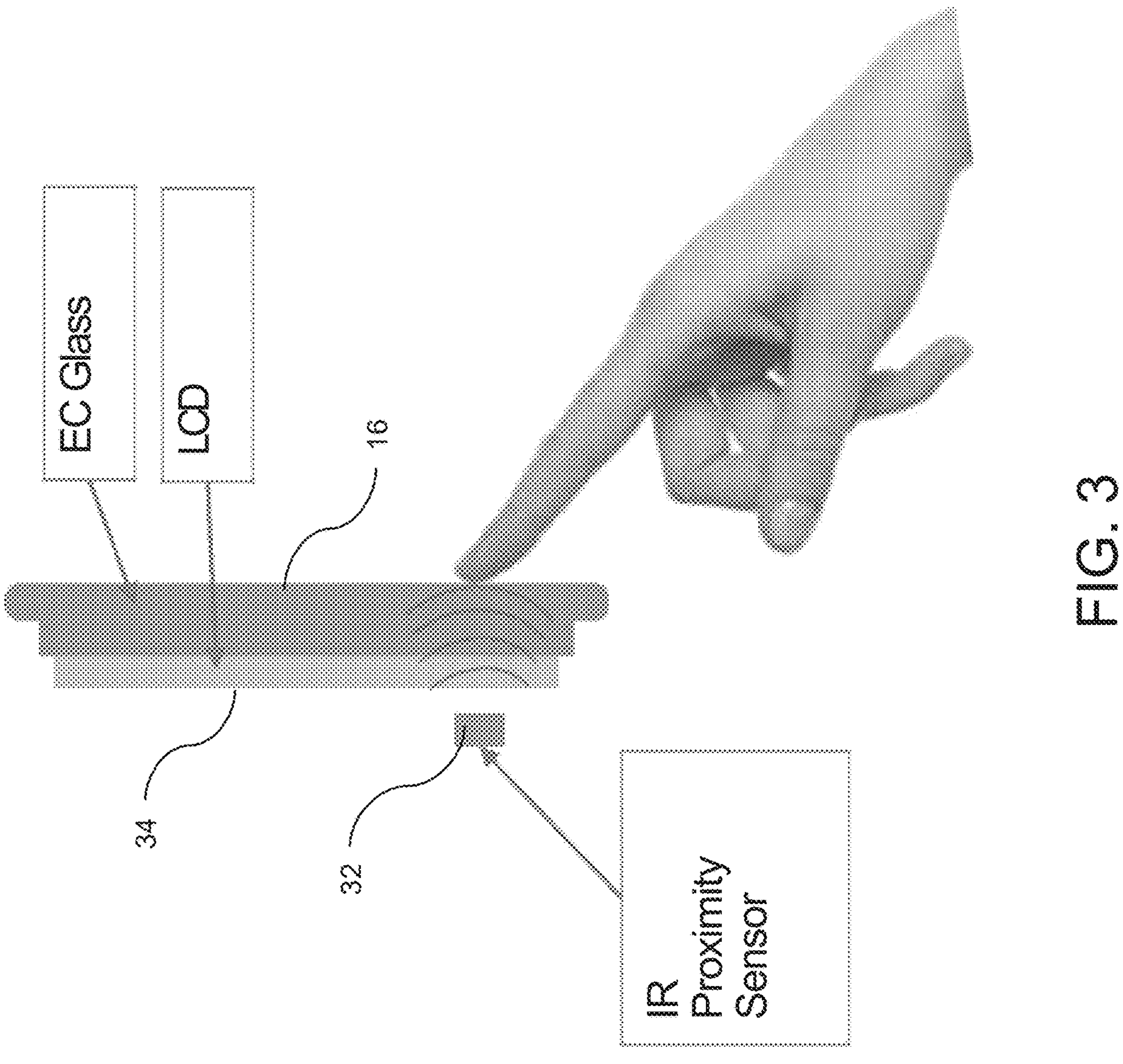
FIG. 3 is a sectional view of the mirror reflective element of the mirror assembly, showing a video display screen behind the mirror reflective element and an infrared (IR) proximity sensor behind the mirror reflective element and the video display screen and sensing presence of a user's finger at or near the outer surface of the mirror reflective element.

In the illustrated embodiment, and as shown in FIG. 2, the mirror reflective element 16 comprises a laminate construction variable reflectance electro-optic (such as electrochromic) reflective element assembly having a front substrate 20 and a rear substrate 22 with an electro-optic medium 24 (such as electrochromic medium) sandwiched therebetween and bounded by a main seal or perimeter seal 26. As shown in FIG. 2, the front substrate 20 has a front or first surface 20*a* (the surface that generally faces the driver of a vehicle when the mirror assembly is normally mounted at the vehicle) and a rear or second surface 20*b* opposite the front surface 20*a*, and the rear substrate 22 has a front or third surface 22*a* and a rear or fourth surface 22*b* opposite the front surface 22*a*, with the electro-optic medium 24 disposed between the second surface 20*b* and the third surface 22*a* and bounded by the perimeter seal 26 of the reflective element. The second surface 20*b* of the front glass substrate 20 has a transparent conductive coating 28 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 22*a* of the rear glass substrate 22 has a reflector coating 30 (or multiple layers or coatings) established thereat. The front or third surface 22*a* of the rear substrate 22 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element).

The third surface 22*a* defines the active EC area or surface of the rear substrate within the perimeter seal 26. The coated third surface 22*a* may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

To provide touch sensing at the mirror reflective element, capacitive inputs or sensors or buttons may be disposed at the mirror head at or near the mirror reflective element, such as at or along a lower edge region of the mirror reflective element and, optionally, along a chin region that extends along the lower edge region of the mirror head. Isolation lines (e.g., etched or ablated, such as laser ablated, isolation lines that extend through the electrically conductive coating) that are devoid of electrically conductive material may electrically isolate circuits between the glass substrates of the mirror reflective element for the dimmable electrochromic mirror reflective element and the capacitive buttons at the mirror reflective element. However, incomplete ablation between the EC area and conductive areas corresponding to the capacitive buttons may leave a small amount of conductive material that interferes with the capacitive touch sensors. That is, capacitive touch on the EC cell requires complete ablation of the conductive layer to electrically isolate the circuit of the electrically dimmable medium from the circuits of the capacitive buttons as incomplete ablation hinders performance of the capacitive touch. Further, tactile switches for user inputs are not as ergonomic and may seem less technically sophisticated.

Referring to FIGS. 3-9, the mirror assembly 10 includes one or more touch or proximity sensors, such as IR proximity sensors 32, accommodated within the mirror head 12 and configured to sense presence of a user's finger at or near the mirror reflective element 16 using reflected IR or near IR light. That is, IR or near IR light is reflected from a user's finger at or near the mirror reflective element 16 and passes through the mirror reflective element 16 to be detected by the IR proximity sensor 32. Based on the near IR light sensed by the one or more IR proximity sensors 32, position of the user's finger at or near the mirror reflective element 16 is determined and a corresponding user input is actuated. The IR or near IR light may be emitted by a light emitter integrated with the IR proximity sensor 32, or the IR or near IR light may be emitted by a light emitter disposed within the mirror head remote from the IR proximity sensor or an IR or near IR light emitter disposed elsewhere in the vehicle cabin.

To indicate the input provided by the user actuatable input (e.g., control of a telecommunications system of the vehicle, control of an emergency call system of the vehicle, adjustment of the dimming of the mirror reflective element, and the like) to the user, an icon or image or symbol or indicator may be etched or adhered or otherwise disposed at a surface of one of the glass substrates of the mirror reflective element 16. That is, the icon may be established at the front glass substrate 20 or the rear glass substrate 22 of the mirror reflective element 16 for viewing by the user. When the user touches the outer surface of the mirror reflective element 16 at the portion corresponding to the user actuatable input, the IR proximity sensor 32 generates a signal representative of the user's input.

In the illustrated example, a video display screen 34 is disposed behind the mirror reflective element 16 and, when electrically operated, displays images for viewing by the driver of the vehicle through the mirror reflective element 16. For example, the interior mirror assembly comprises a dual-mode interior rearview video mirror that can switch from a traditional reflection mode to a live-video display mode. The video display screen 34 may include a thin film transistor (TFT) liquid crystal display (LCD) screen. Because the TFT LCD and EC mirror reflective element are at least partially transparent to IR light, the IR proximity sensor 32 may be disposed behind the video display screen 34 and the electrochromic mirror reflective element 16 to sense IR or near IR light that passes through the video display screen 34 and the mirror reflective element 16. That is, at least a portion of IR light or near IR light incident at the mirror reflective element 16 passes through the video display screen 34 and the mirror reflective element 16. Optionally, the proximity sensor 32 may be disposed behind a portion of the mirror reflective element 16 and not behind a portion of the video display screen 34, such as along a lower edge region of the mirror head below a lower edge of the video display screen 34.

Figures 8, 9:
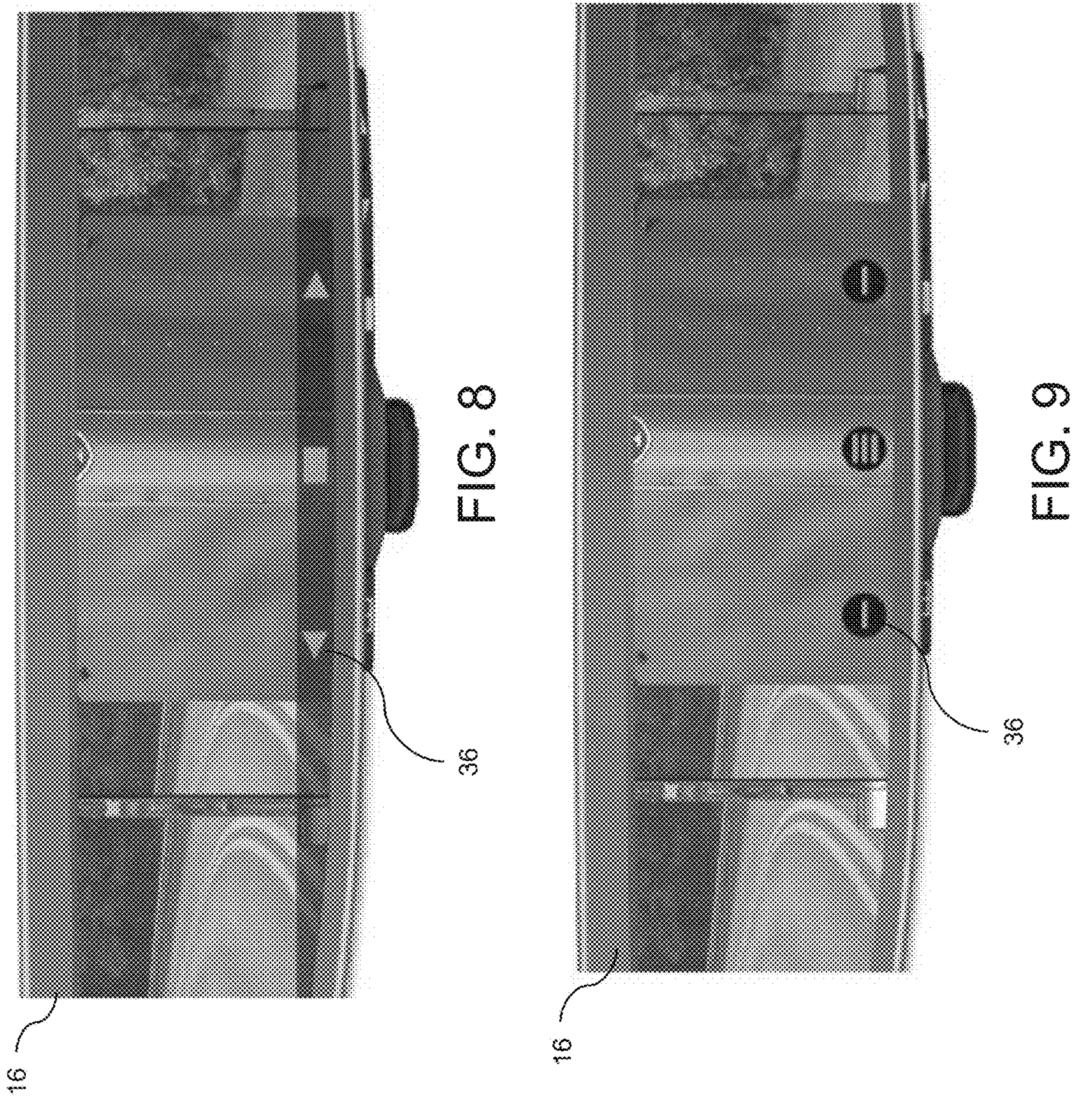
FIGS. 8 and 9 are partial views of the mirror assembly showing example graphic displays at the video display screen.

Optionally, the user inputs may comprise reconfigurable inputs that may provide a control function that is reconfigurable based at least in part on the displayed images at the user inputs. For example, and such as shown in FIGS. 8 and 9, the video display screen 34 may display one or more graphic icons or images 36 at or near positions of the mirror reflective element 16 that correspond to the one or more IR proximity sensors 32. The images 36 may be displayed at portions of the mirror reflective element 16 at the corresponding IR proximity sensors 32 (e.g., the image is displayed over and along the IR proximity sensor behind the mirror reflective element and the video display screen) or the images 36 may be displayed at portions of the mirror reflective element 16 near the corresponding IR proximity sensors 32 (e.g., the image is displayed above or below or along a side of the IR proximity sensor behind the mirror reflective element). The images 36 may correspond to and/or represent an input that is actuated when the user places their finger at or near the IR proximity sensor 32. Thus, when the user touches or places their finger at or near the mirror reflective element 16 at a position indicated by an icon 36, the corresponding IR proximity sensor 32 detects presence of the user's finger and actuates the corresponding input.

For example, the video display screen 34 may display a darkened band along a lower edge region of the mirror reflective element 16 with icons 36 overlaid or superimposed on the band to indicate locations for inputs (FIG. 8). Optionally, the video display screen 34 may display isolated icons 36 overlaid or superimposed onto the displayed video images (FIG. 9). Thus, the video display screen 34 may display the icons 36 at or at least partially over the video images displayed at the display screen 34. Further, the graphics or icons 36 may be adjusted and/or hidden based on a mode of use. For example, the icons 36 may be changed to indicate a current input that would be provided by touching the icon 36, such as to provide inputs for adjusting video images when video images are displayed at the video display screen 34 and to control the telecommunications system when the driver is performing a telephone call.

In some examples, when the user is not touching the mirror reflective element, the icons 36 may be hidden or not displayed at the screen. As the user reaches their hand toward the mirror assembly, one or more of the IR proximity sensors 32 may detect presence of the user's hand approaching the mirror assembly and display the icons 36 at the display screen 34. Touching the mirror reflective element 16 at a position corresponding to one of the IR proximity sensors 32 may trigger the IR proximity sensor 32 to actuate the corresponding input.

Figure 11:
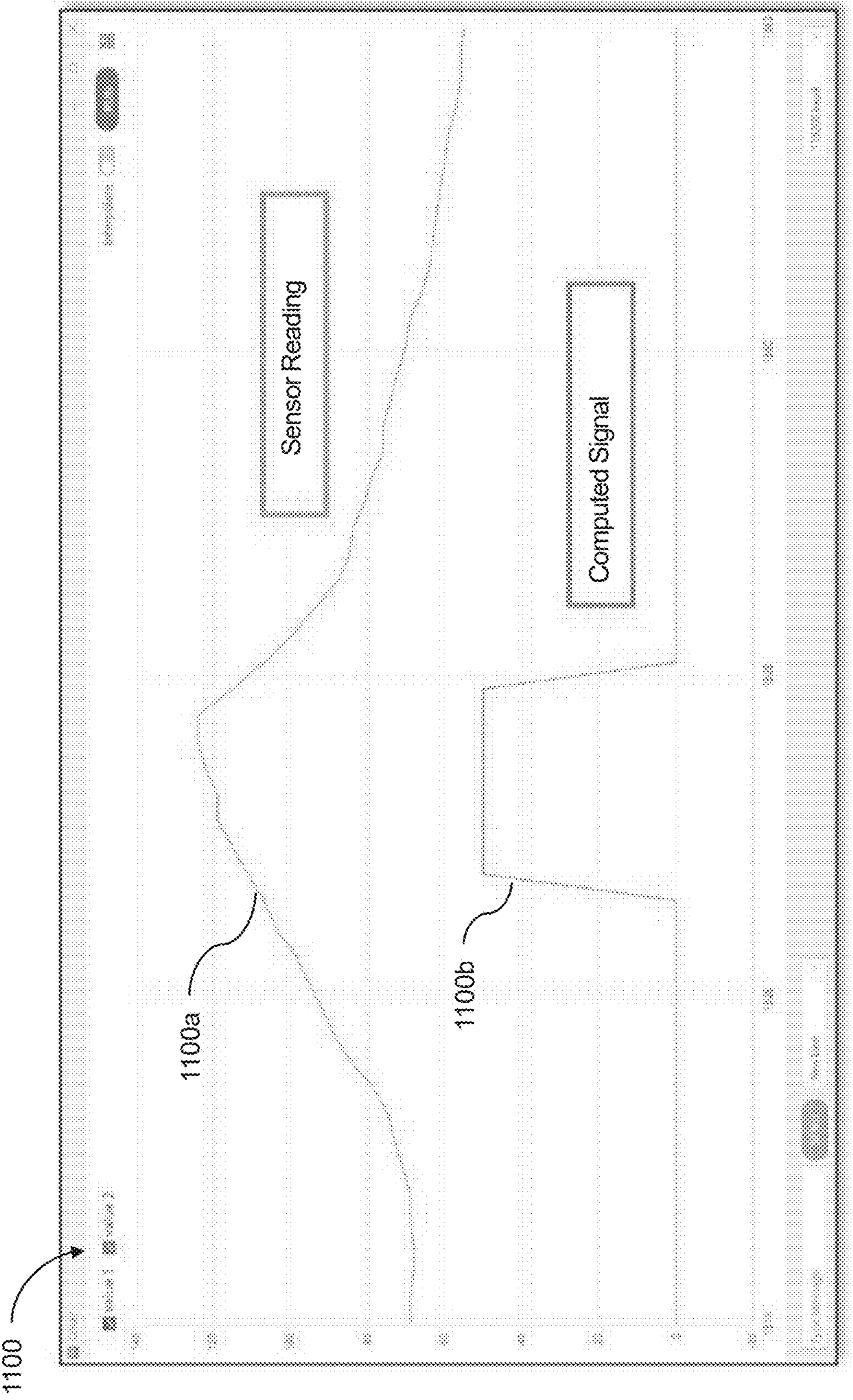
FIG. 11 is a graph showing example sensor data generated by the IR proximity sensor.

For example, and as shown by the graph 1100 of FIG. 11, the sensor data 1100*a* generated by the IR proximity sensor 32 may be translated into a signal 1100*b* for controlling the system of the vehicle, such as based on the proximity of the detected object (i.e., user's finger) being less than a threshold proximity, detection of the object at or near the mirror reflective element for greater than a threshold time, and the like. Control of the vehicle systems using inputs from the IR proximity sensor 32 may be similar to a sensing algorithm used for capacitive touch sensors.

Thus, and as shown in FIGS. 4-7A, the mirror assembly 10 includes a back plate 38 that attaches the mirror reflective element 16 at the mirror casing 14. The one or more IR proximity sensors 32 may be disposed at the back plate 38, such as accommodated within a recess of the back plate 38. For example, the one or more IR proximity sensors 32 may be disposed along a printed circuit board (PCB) that is attached, such as adhesively attached, at the back plate 38 along a lower edge region of the mirror head 12. One or more lens elements, such as a lens array 40, may be disposed over and along the PCB for focusing IR light at the one or more IR proximity sensors 32.

Figure 6:
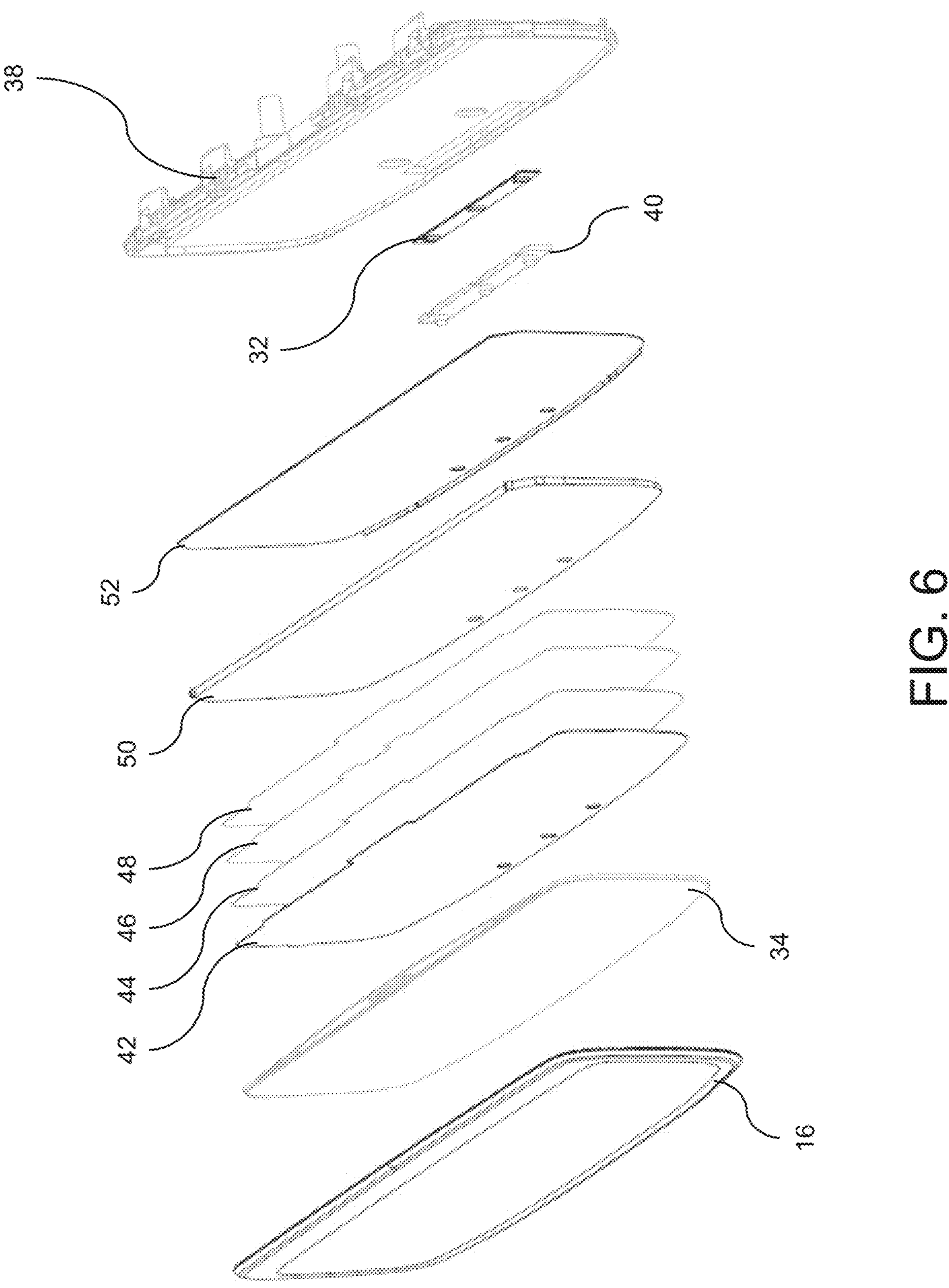
FIG. 6 is an exploded view of the mirror assembly.
Figure 7:
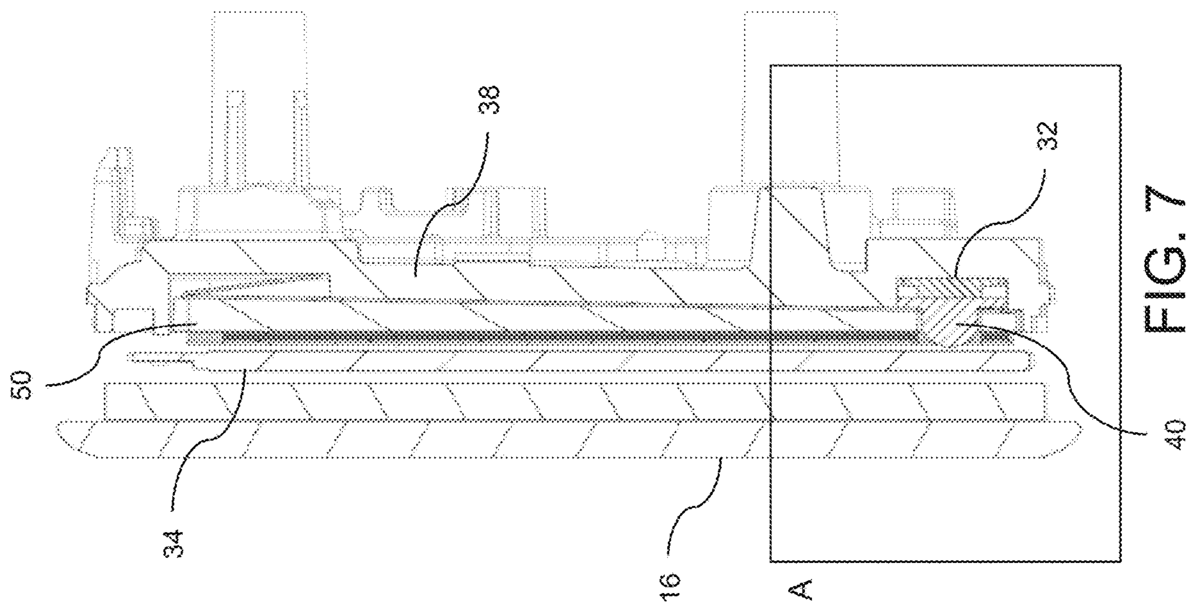
FIG. 7 is a sectional view of the mirror assembly.
Figure 7A:
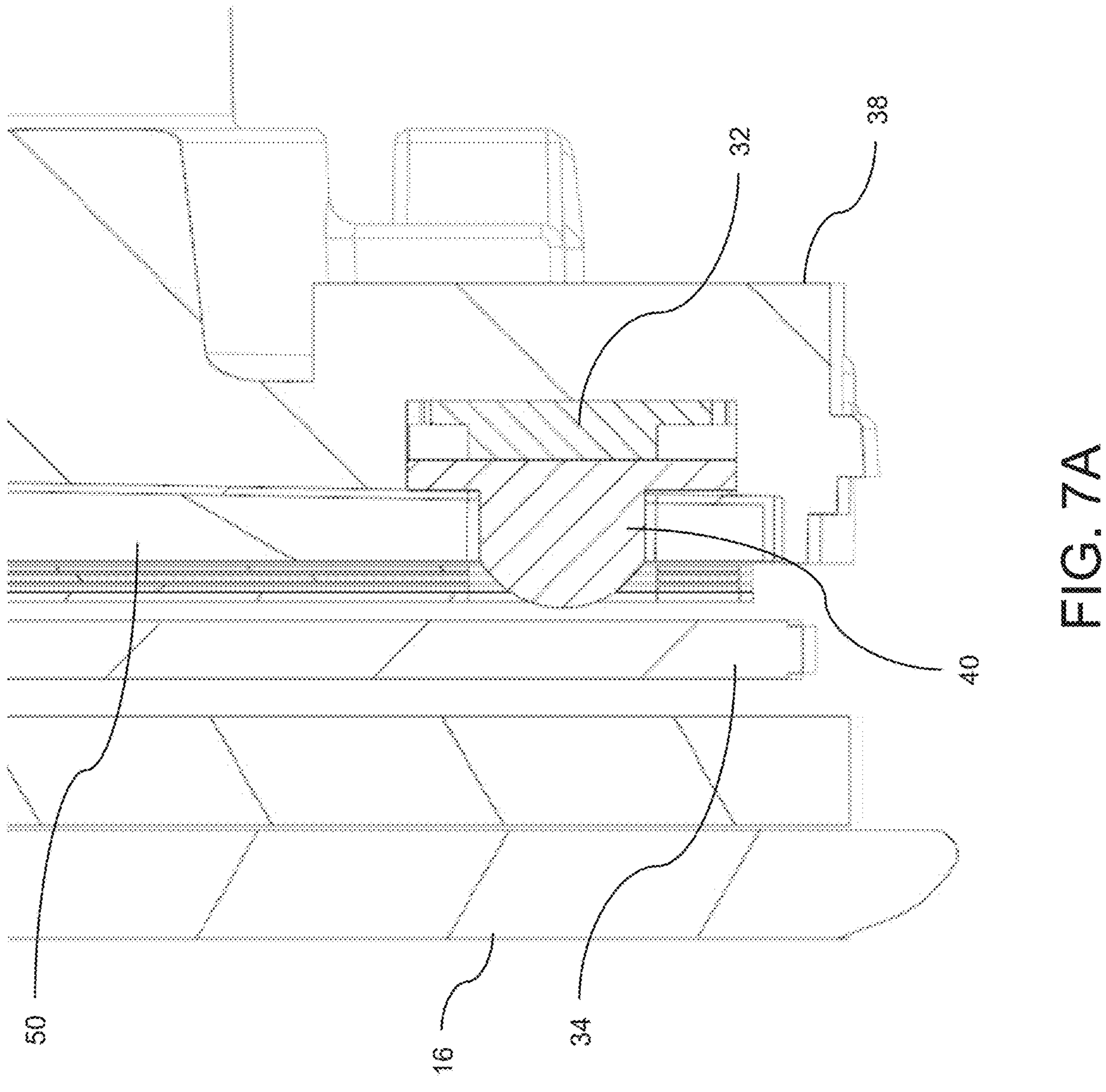
FIG. 7A is an enlarged view of area A in FIG. 7.

With the display screen 34 disposed between the mirror reflective element 16 and the back plate 38, one or more polarizer films or layers may be disposed between the display screen 34 and the back plate 38. For example, a dual brightness enhancement film (DBEF) 42, a first brightness enhancement film (BEF) 44, a second BEF 46, and/or a diffuser 48 may be disposed between the display screen 34 and the back plate 38 (FIG. 6). Further, a light guide 50 and a reflector element 52 may be disposed between the diffuser 48 and the back plate 38. Each of the DBEF 42, first BEF 44, second BEF 46, diffuser 48, light guide 50, and reflector 52 may have respective apertures formed therethrough, with the lens array 40 and the IR proximity sensors 32 aligned with the apertures for detecting near IR light that passes through the mirror reflective element 16, the display screen 34, and the respective apertures (e.g., FIG. 7A). That is, the apertures or holes may be formed at least partially through the optical stack to reduce excessive reflection of the IR or near IR light. Thus, the mirror assembly includes one or more polarizer films and/or one or more light absorption films for controlling the amount of visible light and/or NIR light incident at the mirror reflective element that passes through the mirror reflective element and/or is reflected by the mirror reflector, and the mirror assembly may include characteristics of the mirror assemblies described in U.S. Publication Nos. US-2024-0106986 and/or US-2024-0168355, which are hereby incorporated herein by reference in their entireties. To allow a suitable portion of NIR light to pass through the mirror reflective element for detection by the sensors 32, apertures may be formed through the mirror reflector 52, light guide 50 and one or more polarizer films or diffuser films.

Figure 4:
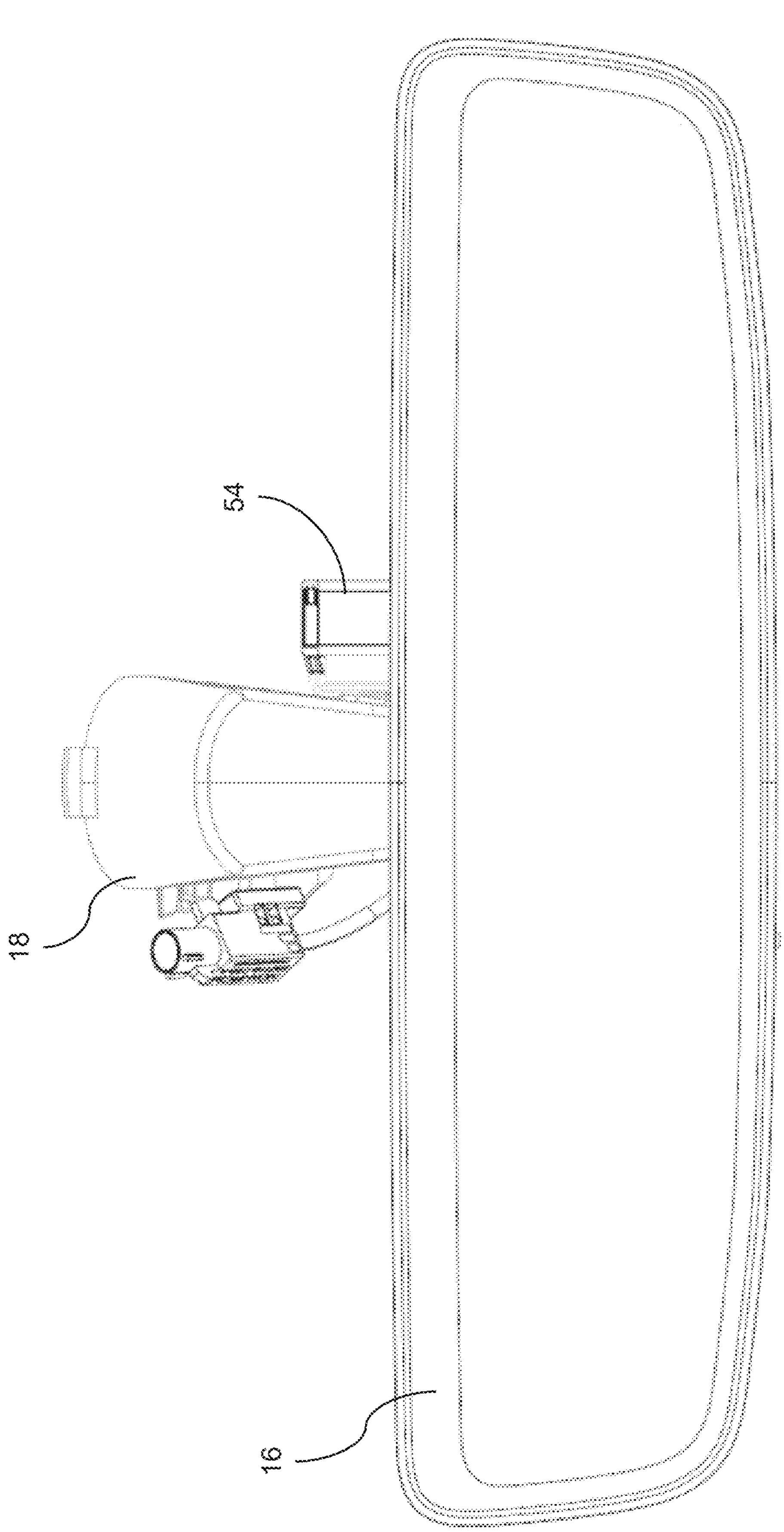
FIGS. 4 and 5 are perspective views of the mirror assembly.
Figure 5:
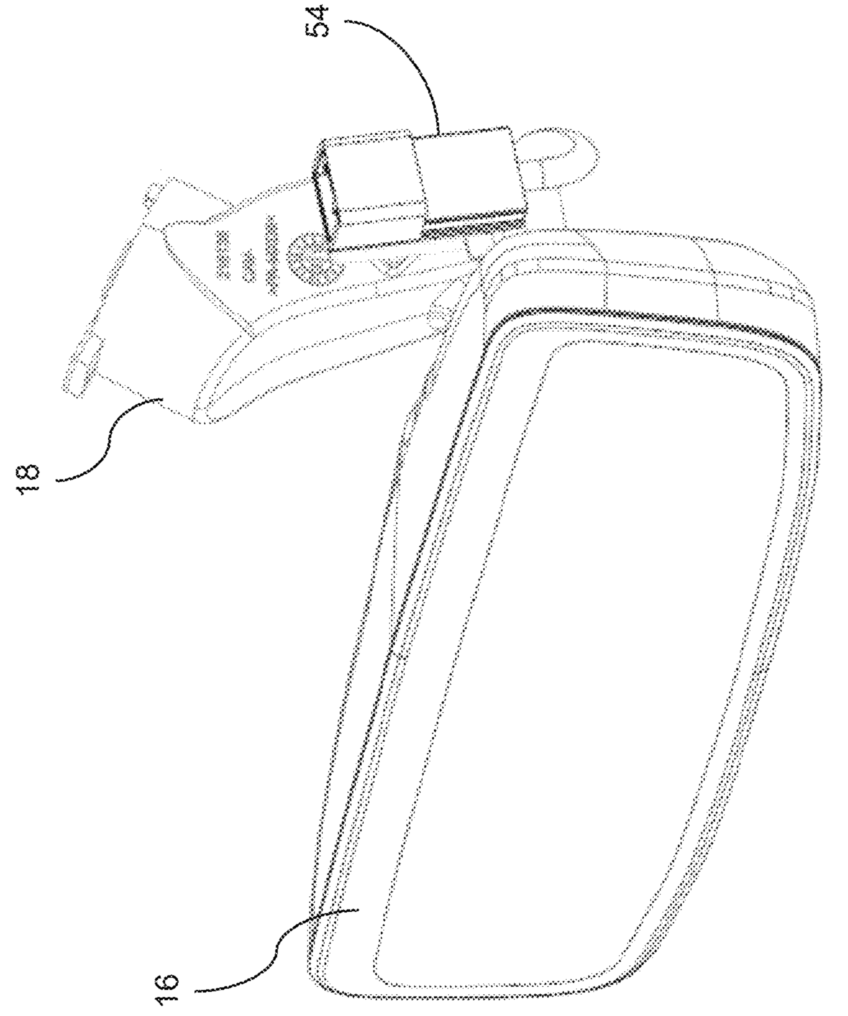

An electrical connector 54 may extend from the mirror casing 14 for connecting the IR proximity sensor PCB and/or the video display screen 34 to systems and/or a power source of the vehicle (FIGS. 4 and 5). For example, an electronic control unit (ECU) for processing sensor data generated by the IR proximity sensors 32 and controlling the associated systems of the vehicle and/or for generating video images for display at the video display screen 34 may be disposed at the vehicle and remote from the mirror head. Although shown as exterior the mirror head 12 and along the mounting structure 18, it should be understood that the electrical connector may be routed through and hidden by the mounting structure 18 for connection to the electronics accommodated by the mirror head. The data transfer or signal communication from the mirror assembly to the ECU may comprise any suitable data or communication link, such as a vehicle network bus or the like of the equipped vehicle.

Figure 10:
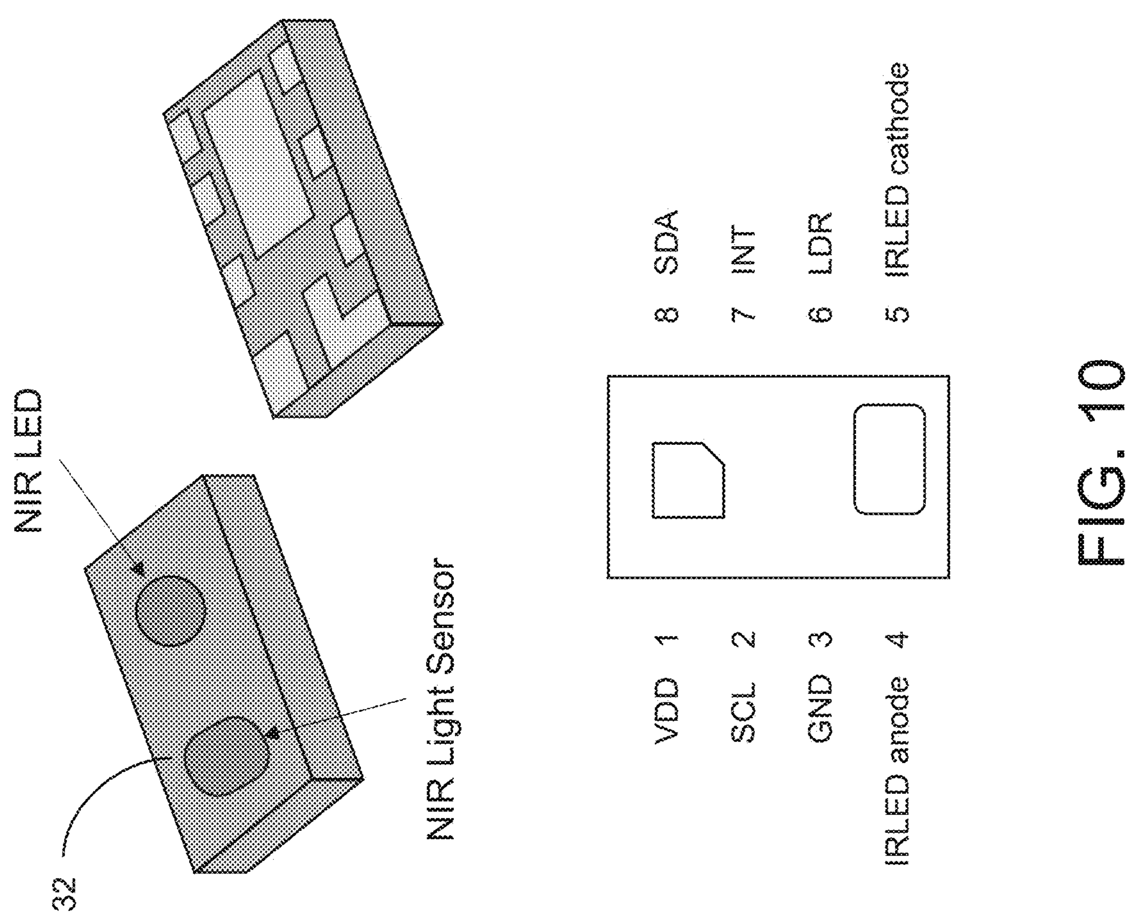
FIG. 10 includes views of the IR proximity sensor.

The proximity or touch sensor 32 may include any suitable proximity or touch sensor. In the illustrated example of FIG. 10, the IR proximity sensor 32 includes a sensor VCNL4030X01 commercially available from Vishay Intertechnology of Malvern, PA. The IR proximity sensor 32 may further provide ambient light sensing, where sensor data generated by the sensor 32 is processed for determining ambient light levels at the vehicle for controlling dimming of the electrochromic mirror reflective element. By determining ambient light levels using sensor data from multiple sensors (i.e., each sensor corresponding to a respective input), dimming of the mirror reflective element may be more accurately controlled and less sensitive to shadows or glare light at the mirror reflective element. Optionally, operation of the video display screen may be controlled or adjusted based on ambient light levels determined via processing of the sensor data generated by the IR proximity sensor 32. For example, brightness or intensity or contrast of the displayed video images may be adjusted based on the determined ambient light levels. Further, the small packaging size of the IR proximity sensor 32 reduces packaging constraints. The IR proximity sensor 32 satisfies AEC-Q101 requirements.

The mirror reflector of the mirror reflective element is at least partially transmissive (such as at least 30 percent transmissive, or at least 50 percent transmissive, or at least 70 percent transmissive) to infrared and/or near infrared light and partially reflective (such as at least 30 percent reflective, or at least 50 percent reflective, or at least 70 percent reflective) to visible light incident thereat. The mirror reflector may include multiple metallic and/or electrically conductive and/or dielectric layers, such as multiple alternating layers of high refractive index and low refractive index materials, such as by utilizing aspects of the mirror reflective elements described in U.S. Pat. Nos. 11,780,372; 11,766,968; 11,639,134; 7,274,501; 7,184,190 and/or 7,255,451, and/or U.S. Publication No. US-2024-0075878, and/or U.S. patent application Ser. No. 18/966,218, filed Dec. 3, 2024 and published on Jun. 5, 2025 as U.S. Publication No. US-2025-0178532, and/or U.S. provisional application Ser. No. 63/651,537, filed May 24, 2024, and/or U.S. provisional application Ser. No. 63/641,574, filed May 2, 2024 and/or U.S. provisional application Ser. No. 63/669,816, filed Jul. 11, 2024, which are all hereby incorporated herein by reference in their entireties. For example, the mirror reflector may comprise alternating layers of $Nb_2O_5$ and $SiO_2$, such as described in U.S. Pat. Nos. 11,780,372 and/or 11,639,134 and/or U.S. provisional application Ser. No. 63/651,537, filed May 24, 2024, and/or U.S. provisional application Ser. No. 63/641,574, filed May 2, 2024, and/or U.S. provisional application Ser. No. 63/669,816, filed Jul. 11, 2024, which are all hereby incorporated herein by reference in their entireties.

The interior mirror assembly comprises a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety. The operating mode of the mirror and video display screen may be selected by flipping the mirror head upward or downward (e.g., via a toggle located at the mirror head) or responsive to another user input. When the mirror is operating in the mirror mode, the video display screen is deactivated and rendered covert by the mirror reflective element, and the driver views rearward via reflection of light incident at the mirror reflective element. When the mirror is operating in the display mode, the video display screen is operated to display video images that are viewable through the mirror reflective element by the driver of the vehicle.

The back plate may comprise any suitable construction. Optionally, for example, a common or universal backplate, whereby the appropriate or selected socket element or pivot element (such as a socket element or such as a ball element or the like) is attached to the backplate to provide the desired pivot joint for the particular mirror head in which the backplate is incorporated. Optionally, when molding the backplate, a different insert may be provided to integrally mold a portion of or all of a ball member or the like (such as a portion of a base of a ball member, whereby the ball member may comprise a metallic ball member that is insert molded at the base and at the rear of the backplate during the injection molding process that forms the backplate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Although shown as an electrochromic mirror application, it is envisioned that the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,451; 6,504,531; 6,501,465; 6,492,980; 6,452,479; 6,437,258 and/or 6,369,804, which are hereby incorporated herein by reference in their entireties, and/or the like.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; 7,657,052 and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, which are hereby incorporated herein by reference in their entireties.

Optionally, the interior rearview mirror assembly may include circuitry therein (such as at a printed circuit board or the like disposed within the mirror casing), and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:

a mirror head adjustable about a mounting base, wherein the mounting base is configured to mount the vehicular interior rearview mirror assembly at an interior portion of an interior cabin of a vehicle;

wherein the mirror head accommodates a mirror reflective element;

wherein, with the vehicular interior rearview mirror assembly mounted at the interior portion of the interior cabin of the vehicle, the mirror head is adjustable by a driver of the vehicle to set a rearward view for the driver;

a light emitter and a light sensor accommodated by the mirror head;

wherein, with the vehicular interior rearview mirror assembly mounted at the interior portion of the interior cabin of the vehicle, and when the light emitter is electrically operated, the light emitter emits near infrared (NIR) light;

wherein, with the vehicular interior rearview mirror assembly mounted at the interior portion of the interior cabin of the vehicle, and when the light emitter is electrically operated to emit NIR light, the light sensor detects NIR light that reflects off an object within the interior cabin of the vehicle and that passes through the mirror reflective element;

wherein, based on detection of NIR light by the light sensor, presence of a user's hand at or near the mirror reflective element is determined;

wherein the mirror reflective element comprises a mirror reflector that is at least partially transmissive of NIR light and is at least partially reflective of visible light incident thereat, and wherein the light sensor detects NIR light that reflects off the object within the interior cabin of the vehicle and that passes through the mirror reflector; and wherein the mirror reflector comprises a stack of coatings including at least (i) a first coating of a first non-metallic material, (ii) a second coating of a second non-metallic material different from the first non-metallic material and (iii) a third coating of the first non-metallic material.

2. The vehicular interior rearview mirror assembly of claim 1, wherein an icon is disposed at the mirror reflective element, and wherein, based on detection of NIR light by the light sensor, presence of the user's hand at or near the icon at the mirror reflective element is determined.

3. The vehicular interior rearview mirror assembly of claim 2, wherein the mirror head accommodates a video mirror display screen that, when electrically operated, displays video images that are viewable through the mirror reflective element by the driver of the vehicle, and wherein the icon comprises a graphical display displayed at the video mirror display screen.

4. The vehicular interior rearview mirror assembly of claim 3, wherein the graphical display is superimposed at the displayed video images.

5. The vehicular interior rearview mirror assembly of claim 2, wherein the light sensor generates sensor data based on detection of NIR light that passes through the mirror reflective element, and wherein presence of the user's hand at or near the icon at the mirror reflective element is determined based at least in part on processing of the generated sensor data.

6. The vehicular interior rearview mirror assembly of claim 2, wherein, based on determination of the user's hand at or near the icon at the mirror reflective element, a control signal is generated for controlling a system of the vehicle.

7. The vehicular interior rearview mirror assembly of claim 6, wherein an appearance of the icon is representative of the system of the vehicle that receives the generated control signal.

8. The vehicular interior rearview mirror assembly of claim 2, wherein the icon is etched at a surface of a glass substrate of the mirror reflective element.

9. The vehicular interior rearview mirror assembly of claim 1, wherein a polarizer film is disposed between the mirror reflective element and the light sensor, and wherein the light sensor is aligned with an aperture of the polarizer film.

10. A vehicular interior rearview mirror assembly, the vehicular interior rearview mirror assembly comprising:

- a mirror head adjustable about a mounting base, wherein the mounting base is configured to mount the vehicular interior rearview mirror assembly at an interior portion of an interior cabin of a vehicle;
- wherein the mirror head accommodates a mirror reflective element;
- wherein, with the vehicular interior rearview mirror assembly mounted at the interior portion of the interior cabin of the vehicle, the mirror head is adjustable by a driver of the vehicle to set a rearward view for the driver;
- a light emitter and a light sensor accommodated by the mirror head;
- wherein, with the vehicular interior rearview mirror assembly mounted at the interior portion of the interior cabin of the vehicle, and when the light emitter is electrically operated, the light emitter emits near infrared (NIR) light;
- wherein, with the vehicular interior rearview mirror assembly mounted at the interior portion of the interior cabin of the vehicle, and when the light emitter is electrically operated to emit NIR light, the light sensor detects NIR light that reflects off an object within the interior cabin of the vehicle and that passes through the mirror reflective element;
- wherein, based on detection of NIR light by the light sensor, presence of a user's hand at or near the mirror reflective element is determined; and
- wherein the light sensor, with the vehicular interior rearview mirror assembly mounted at the interior portion of the interior cabin of the vehicle, and when the light emitter is not electrically operated to emit NIR light, detects ambient light within the interior cabin of the vehicle.

11. The vehicular interior rearview mirror assembly of claim 10, wherein the mirror reflective element comprises an electrochromic mirror reflective element, and wherein dimming of the electrochromic mirror reflective element is controlled based at least in part on the ambient light detected by the light sensor.

12. The vehicular interior rearview mirror assembly of claim 10, wherein the mirror head accommodates a video mirror display screen that, when electrically operated, displays video images that are viewable through the mirror reflective element by the driver of the vehicle, and wherein the displayed video images are controlled based at least in part on the ambient light detected by the light sensor.

13. The vehicular interior rearview mirror assembly of claim 12, wherein at least one selected from the group consisting of (i) intensity of the displayed video images is controlled based at least in part on the ambient light detected by the light sensor and (ii) contrast of the displayed video images is controlled based at least in part on the ambient light detected by the light sensor.

14. The vehicular interior rearview mirror assembly of claim 1, wherein the light emitter comprises part of the light sensor.

15. The vehicular interior rearview mirror assembly of claim 1, wherein the mirror reflective element comprises an electrochromic mirror reflective element.

16. The vehicular interior rearview mirror assembly of claim 1, wherein a video mirror display screen is accommodated by the mirror head, and wherein, with the vehicular interior rearview mirror assembly mounted at the interior portion of the interior cabin of the vehicle, the video mirror display screen, when electrically operated, displays video images that are viewable through the mirror reflective element by the driver of the vehicle.

17. The vehicular interior rearview mirror assembly of claim 16, wherein the light sensor detects NIR light that reflects off the object within the interior cabin of the vehicle and that passes through the mirror reflective element and through the video mirror display screen.

18. The vehicular interior rearview mirror assembly of claim 1, wherein the light sensor is aligned with an aperture of the mirror reflector.

19. A vehicular interior rearview mirror assembly, the vehicular interior rearview mirror assembly comprising:

- a mirror head adjustable about a mounting base, wherein the mounting base is configured to mount the vehicular interior rearview mirror assembly at an interior portion of an interior cabin of a vehicle;
- wherein the mirror head accommodates an electrochromic mirror reflective element;
- wherein, with the vehicular interior rearview mirror assembly mounted at the interior portion of the interior cabin of the vehicle, the mirror head is adjustable by a driver of the vehicle to set a rearward view for the driver;
- a sensor module accommodated by the mirror head, wherein the sensor module comprises (i) a light emitter that is electrically operated to emit near infrared (NIR) light, (ii) a NIR light sensor and (iii) an ambient light sensor;
- wherein, with the vehicular interior rearview mirror assembly mounted at the interior portion of the interior cabin of the vehicle, and when the light emitter is electrically operated to emit NIR light, the NIR light sensor detects NIR light that reflects off an object within the interior cabin of the vehicle and that passes through the electrochromic mirror reflective element;
- wherein, with the vehicular interior rearview mirror assembly mounted at the interior portion of the interior cabin of the vehicle, the ambient light sensor detects ambient light within the interior cabin of the vehicle, and wherein dimming of the electrochromic mirror reflective element is controlled based at least in part on the ambient light detected by the ambient light sensor;

wherein, based on detection of NIR light by the NIR light sensor, presence of a user's hand at or near an icon at the electrochromic mirror reflective element is determined, and wherein, based on determination of the user's hand at or near the icon at the electrochromic mirror reflective element, a control signal is generated for controlling a system of the vehicle;

wherein the electrochromic mirror reflective element comprises a mirror reflector that is at least partially transmissive of NIR light and is at least partially reflective of visible light incident thereat, and wherein the light sensor detects NIR light that reflects off the object within the interior cabin of the vehicle and that passes through the mirror reflector; and wherein the mirror reflector comprises a stack of coatings including at least (i) a first coating of a first non-metallic material, (ii) a second coating of a second non-metallic material different from the first non-metallic material and (iii) a third coating of the first non-metallic material.

20. The vehicular interior rearview mirror assembly of claim 19, wherein the mirror head accommodates a video mirror display screen that, when electrically operated, displays video images that are viewable through the electrochromic mirror reflective element by the driver of the vehicle, and wherein the icon comprises a graphical display displayed at the video mirror display screen.

21. The vehicular interior rearview mirror assembly of claim 19, wherein the NIR light sensor generates sensor data based on detection of NIR light that passes through the electrochromic mirror reflective element, and wherein presence of the user's hand at or near the icon at the electrochromic mirror reflective element is determined based at least in part on processing of the generated sensor data.

22. The vehicular interior rearview mirror assembly of claim 19, wherein the icon is etched at a surface of a glass substrate of the electrochromic mirror reflective element.

23. The vehicular interior rearview mirror assembly of claim 19, wherein a polarizer film is disposed between the electrochromic mirror reflective element and the NIR light sensor, and wherein the light sensor is aligned with an aperture of the polarizer film.

24. A vehicular interior rearview mirror assembly, the vehicular interior rearview mirror assembly comprising:

a mirror head adjustable about a mounting base, wherein the mounting base is configured to mount the vehicular interior rearview mirror assembly at an interior portion of an interior cabin of a vehicle;

wherein the mirror head accommodates an electrochromic mirror reflective element;

wherein, with the vehicular interior rearview mirror assembly mounted at the interior portion of the interior cabin of the vehicle, the mirror head is adjustable by a driver of the vehicle to set a rearward view for the driver;

wherein a video mirror display screen is accommodated by the mirror head, and wherein, with the vehicular interior rearview mirror assembly mounted at the interior portion of the interior cabin of the vehicle, the video mirror display screen, when electrically operated, displays video images that are viewable through the electrochromic mirror reflective element by the driver of the vehicle;

a light emitter and a light sensor accommodated by the mirror head;

wherein, with the vehicular interior rearview mirror assembly mounted at the interior portion of the interior cabin of the vehicle, and when the light emitter is electrically operated, the light emitter emits near infrared (NIR) light;

wherein, with the vehicular interior rearview mirror assembly mounted at the interior portion of the interior cabin of the vehicle, and when the light emitter is electrically operated to emit NIR light, the light sensor detects NIR light that reflects off an object within the interior cabin of the vehicle and that passes through the electrochromic mirror reflective element and the video mirror display screen;

wherein the light sensor, with the vehicular interior rearview mirror assembly mounted at the interior portion of the interior cabin of the vehicle, and when the light emitter is not electrically operated to emit NIR light, detects ambient light within the interior cabin of the vehicle;

wherein dimming of the electrochromic mirror reflective element is controlled based at least in part on the ambient light detected by the light sensor, and wherein the displayed video images are controlled based at least in part on the ambient light detected by the light sensor; and wherein, based on detection of NIR light by the light sensor, presence of a user's hand at or near the electrochromic mirror reflective element is determined.

25. The vehicular interior rearview mirror assembly of claim 24, wherein an icon is disposed at the electrochromic mirror reflective element, and wherein, based on detection of NIR light by the light sensor, presence of the user's hand at or near the icon at the electrochromic mirror reflective element is determined.

26. The vehicular interior rearview mirror assembly of claim 24, wherein a polarizer film is disposed between the electrochromic mirror reflective element and the light sensor, and wherein the light sensor is aligned with an aperture of the polarizer film.

27. The vehicular interior rearview mirror assembly of claim 24, wherein at least one selected from the group consisting of (i) intensity of the displayed video images is controlled based at least in part on the ambient light detected by the light sensor and (ii) contrast of the displayed video images is controlled based at least in part on the ambient light detected by the light sensor.

28. The vehicular interior rearview mirror assembly of claim 24, wherein the electrochromic mirror reflective element comprises a mirror reflector that is at least partially transmissive of NIR light and is at least partially reflective of visible light incident thereat, and wherein the light sensor detects NIR light that reflects off the object within the interior cabin of the vehicle and that passes through the mirror reflector.

* * * * *